(12) United States Patent
Emtman et al.

(10) Patent No.: US 9,021,715 B2
(45) Date of Patent: May 5, 2015

(54) ELECTRONIC CALIPER CONFIGURED TO GENERATE POWER FOR MEASUREMENT OPERATIONS

(71) Applicant: Mitutoyo Corporation, Kawasaki-shi, Kanagawa-ken (JP)

(72) Inventors: Casey Emtman, Kirkland, WA (US); Michael Nahum, Kirkland, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 237 days.

(21) Appl. No.: 13/705,105

(22) Filed: Dec. 4, 2012

(65) Prior Publication Data
US 2014/0150272 A1  Jun. 5, 2014

(51) Int. Cl.
| | | |
|---|---|---|
| *G01B 5/00* | (2006.01) | |
| *G01B 3/30* | (2006.01) | |
| *G01B 3/20* | (2006.01) | |
| *G01B 3/18* | (2006.01) | |
| *G01B 7/02* | (2006.01) | |
| G01B 5/14 | (2006.01) | |

(52) U.S. Cl.
CPC .. *G01B 3/30* (2013.01); *G01B 3/20* (2013.01); *G01B 3/18* (2013.01); *G01B 7/02* (2013.01); *G01B 3/205* (2013.01)

(58) Field of Classification Search
CPC ............ G01B 3/205; G01B 3/18; G01B 7/02; G01B 11/02; G01B 3/30
USPC .......................................... 33/783, 784, 810
See application file for complete search history.

(56) References Cited

U.S. PATENT DOCUMENTS

| | | | |
|---|---|---|---|
| 3,742,609 A | 7/1973 | Jeannet | |
| 4,573,270 A | 3/1986 | D'Amico | |
| 4,644,660 A | 2/1987 | Mathes | |
| 4,963,811 A | 10/1990 | Weber | |
| 5,102,471 A * | 4/1992 | Sasaki | ......................... 136/244 |
| 5,229,738 A | 7/1993 | Knapen | |
| 5,574,381 A | 11/1996 | Andermo | |
| 5,901,458 A | 5/1999 | Andermo | |
| 5,923,619 A | 7/1999 | Knapen | |

(Continued)

OTHER PUBLICATIONS

Maurath, D., et al., "Highly Efficient Integrated Rectifier and Voltage Boosting Circuits for Energy Harvesting Applications," Advances in Radio Science 6:219-225, 2008.

*Primary Examiner* — Laura Martin
*Assistant Examiner* — Rhyan C Lange
(74) *Attorney, Agent, or Firm* — Christensen O'Connor Johnson Kindness PLLC (57) ABSTRACT

An electronic caliper generates power for measurement operations. The caliper comprises a scale member, a slider, a signal processing portion configured to measure a displacement between the scale member and slider, a power generating arrangement attached to the slider comprising a gear assembly configured to rotate in response to a force provided through a power generating handle to the gear assembly by a user moving the power generating handle relative to the gear assembly, and a power generator coupled to the gear assembly and configured to rotate in response to force provided by the rotating gear assembly and provide power to the signal processing portion. The power generating arrangement generates power as the user moves the power generating handle, and the power generating arrangement contributes a motion resistance force component of at most 20N as the user moves the power generating handle with a maximum manual acceleration.

20 Claims, 8 Drawing Sheets

(56) References Cited

U.S. PATENT DOCUMENTS

| | | |
|---|---|---|
| 5,973,494 A | 10/1999 | Masreliez |
| 6,124,649 A | 9/2000 | Schafroth |
| 6,279,248 B1 | 8/2001 | Walters |
| RE37,490 E | 1/2002 | Andermo |
| 6,400,138 B1 | 6/2002 | Andermo |
| 6,834,439 B2 | 12/2004 | Matsumiya |
| 7,533,474 B2 | 5/2009 | Saito |
| 2002/0047333 A1* | 4/2002 | You .................................. 310/47 |
| 2003/0047009 A1 | 3/2003 | Webb |
| 2003/0217478 A1 | 11/2003 | Matsumiya |
| 2007/0068027 A1* | 3/2007 | Suzuki ............................. 33/784 |
| 2008/0052942 A1* | 3/2008 | Kawatoko ........................ 33/702 |
| 2008/0057895 A1* | 3/2008 | Hsu ............................. 455/187.1 |
| 2010/0046180 A1* | 2/2010 | Zhou et al. ..................... 361/752 |
| 2013/0269199 A1 | 10/2013 | Biselx |
| 2014/0150274 A1* | 6/2014 | Emtman et al. ................. 33/810 |

\* cited by examiner

ELECTRONIC CALIPER CONFIGURED TO GENERATE POWER FOR MEASUREMENT OPERATIONS

FIELD

The present application relates generally to metrology systems, and more particularly to an electronic caliper that is capable of generating power.

BACKGROUND

Various electronic calipers are known that use electronic position encoders. These encoders are generally based on low-power inductive, capacitive, or magnetic position sensing technology. In general, an encoder may comprise a readhead and a scale. The readhead may generally comprise a readhead sensor and readhead electronics. The readhead outputs signals that vary as a function of the position of the readhead sensor relative to the scale, along a measuring axis. In an electronic caliper, the scale is generally affixed to an elongated scale member that includes a first measuring jaw and the readhead is affixed to a slider which is movable along the scale member and which includes a second measuring jaw. Thus, measurements of the distance between the two measuring jaws may be determined based on the signals from the readhead.

Exemplary electronic calipers are disclosed in commonly assigned U.S. Pat. Nos. RE37490, 5,574,381, and 5,973,494, each of which is hereby incorporated by reference in its entirety. Caliper technology emphasizes the need for lower power consumption, for example, U.S. Pat. No. 5,973,494 discloses configurations which reduce power consumption in a caliper. Nonetheless, even in low power configurations, batteries need replacement periodically. This is seen by some users as an unwanted inconvenience and/or expense. A caliper which eliminates battery replacement, or significantly postpones replacement, is desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

When generating power to eliminate or postpone the need for battery replacement in a caliper, it would be desirable and most convenient if power generation in the caliper results from ergonomic and convenient motions over a relatively short range of motion.

An electrically powered caliper configured to generate power for measurement signal processing operations is disclosed which comprises: a scale member; a slider; a signal processing portion configured to measure a displacement between the scale member and the slider; a power generating arrangement attached to the slider, comprising a gear assembly configured to rotate in response to a force provided through a power generating handle to the gear assembly by a user moving the power generating handle relative to the gear assembly; a power generator coupled to the gear assembly and configured to rotate in response to force provided by the rotating gear assembly and provide power to the signal processing portion. The power generating arrangement generates power as the user moves the power generating handle; and the power generating arrangement is configured such that it contributes a motion resistance force component of at most 20N as the user moves the power generating handle with a maximum manual acceleration.

In various embodiments, the power generating arrangement is configured such that it contributes a motion resistance force component of at most 20N, or 10N in other embodiments, or less, while the user moves the power generating handle using a maximum manual speed or less. The motion resistance force component may comprise an inertia component and a generator work component. The motion resistance force component contributed by the power generating arrangement may be measured by determining a difference in the motion resistance force of the power generating handle with the power generating arrangement engaged, such that it is driven by moving the power generating handle, and the motion resistance force of the power generating handle with the power generating arrangement disengaged, such that the power generating handle motion does not drive any elements of the power generating arrangement. The maximum manual acceleration and speed refer to the maximum accelerations and speeds that may be expected to be achievable by typical caliper users when moving the power generating handle.

In some embodiments, the gear assembly may comprise a force-limiting clutch which is configured to limit the motion resistance force component. In some embodiments, the gear assembly may comprise an input element that is driven by the force provided through the power generating handle and the force-limiting clutch is located between the input element and a gear coupled to the input element by the force-limiting clutch. In some embodiments, the force-limiting clutch may be configured to limit the motion resistance force component to at most 10 N.

In some embodiments, the gear assembly may comprise an input element that is driven by the force provided through the power generating handle comprising one of a gear and a friction roller. In some embodiments, the input element may comprise a gear which is driven by a rack attached to the power generating handle. In some embodiments, the input element may comprise a friction roller which is driven by a flat surface of the power generating handle. In some embodiments, the caliper may comprise a spring element which presses the friction roller against the power generating handle.

In some embodiments, the gear assembly may comprise an input element of a smaller diameter that is coupled to an outer gear of a larger diameter that drives an inner gear of a smaller diameter which is coupled to another outer gear of a larger diameter that drives the power generator through at least one additional gear.

In some embodiments, the gear assembly comprises at most six gears.

In some embodiments, the power generating handle may be constrained on the slider.

In some embodiments, the gear assembly may comprise gears with a diametral pitch of at least 80 teeth per inch.

In some embodiments, the range of motion of the power generating handle is limited to at most 2.5 inches, or 1.25 inches in other embodiments, or less.

In some embodiments, the gear assembly may comprise gears with a face width of at most 0.15 inches.

In some embodiments, the power generating handle may be connected to a reciprocating element configured to drive the input element in the same rotational direction when the user moves the power generating handle in either of opposite directions. In some embodiments, the reciprocating element includes an upper and lower rack which each drive the same gear at different times, depending on the movement direction of the power generating handle.

In some embodiments, at least some gears of the power generating arrangement may be located in a volume between the top of the scale member and the inside of a cover which encloses the signal processing portion.

In some embodiments, at least some gears of the power generating arrangement may be located in a volume between the bottom of the scale member and an inside surface of a portion of the slider that wraps around the bottom of the scale member.

In some embodiments, the caliper may further comprise a return spring which stores energy to return the power generating handle to its starting position when the user releases it after generating power in a direction that stores energy in the return spring.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
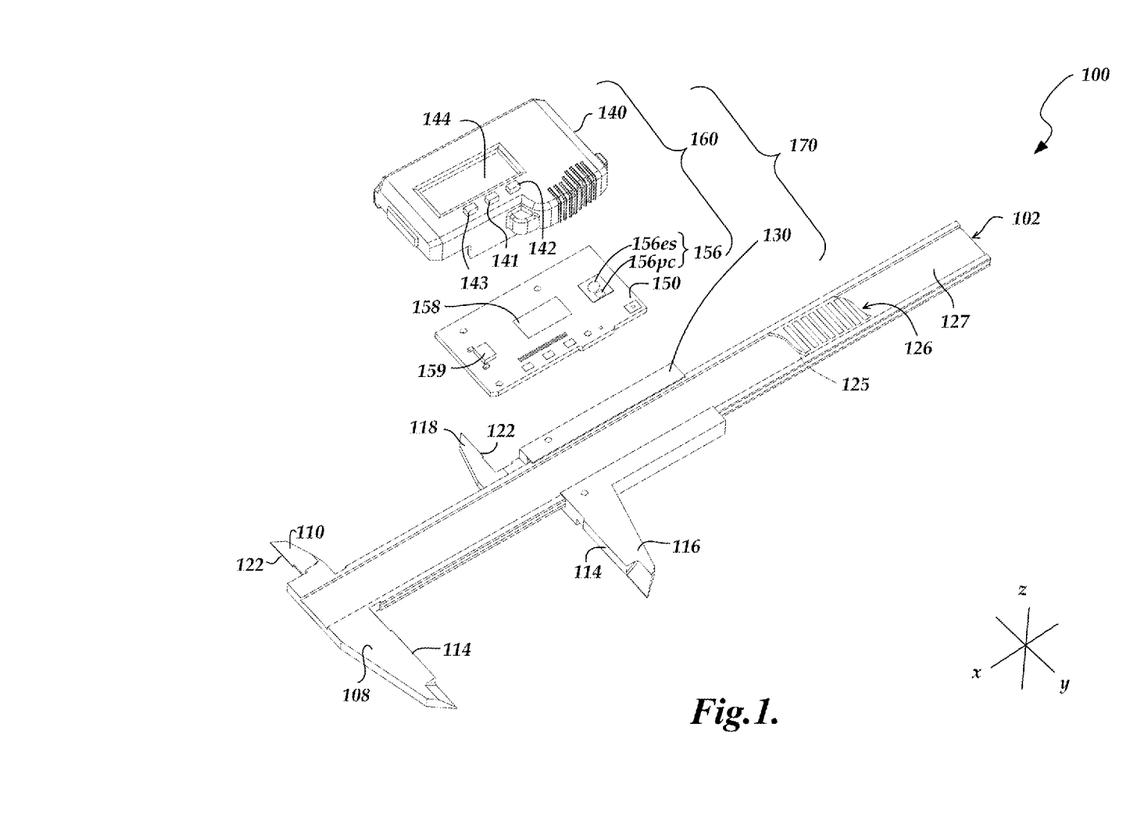
FIG. 1 is an exploded view diagram of a hand tool type caliper which may be adapted to the principles disclosed herein.

FIG. 1 is an exploded view diagram of one embodiment of a hand tool type caliper 100 which may be adapted to the principles disclosed herein to generate power. In this example, the caliper 100 comprises a magnetic or inductive sensor assembly 158 and a scale substrate 125 including a scale track 126 (a cutaway segment of each is illustrated) that is positioned in a groove 127 along an elongated scale member 102. A slider assembly 170 includes an electronic assembly 160 attached to a slider 130. The magnetic or inductive sensor assembly 158 is included in the electronic assembly 160.

The general mechanical structure and physical operation of the caliper 100 is similar to that of certain prior electronic calipers, such as that of commonly assigned U.S. Pat. No. 5,901,458, which is hereby incorporated by reference in its entirety. The scale member 102 is a rigid or semi-rigid bar which may include various grooves and/or other features incorporated into a generally rectangular cross section. The scale substrate 125 may be rigidly bonded in the groove 127, and the scale track 126 may include scale elements that cooperate with corresponding elements (not shown) of the sensor assembly 158 included in the electronic assembly 160, in a manner similar to that used in known electronic calipers and as described in previously incorporated U.S. Pat. Nos. RE37490 and 5,901,458 patents, and commonly assigned U.S. Pat. No. 6,400,138, which is incorporated herein by reference in its entirety.

A pair of jaws 108 and 110 is integrally formed near a first end of the scale member 102. A corresponding pair of jaws 116 and 118 is formed on the slider 130. The outside dimensions of a workpiece are measured by placing the workpiece between a pair of engagement surfaces 114 of the jaws 108 and 116. Similarly, the inside dimensions of a workpiece are measured by placing a pair of engagement surfaces 122 of the jaws 110 and 118 against opposing internal surfaces of the workpiece. In a position sometimes referenced as the zero position, the engagement surfaces 114 abut one another, the engagement surfaces 122 are aligned, and both the outside and inside dimensions measured by the caliper 100 may be indicated as zero.

The measured dimension may be displayed on a digital display 144, which is mounted within a cover 140 of the electronic assembly 160 of the caliper 100. The electronic assembly 160 may also include a set of push button switches 143, 141, and 142 (e.g., an on/off switch, mode switch, and zero set switch), and a signal processing and display circuit board 150 comprising a readhead signal processing and control circuit 159. In one embodiment shown in FIG. 1, the bottom surface of the signal processing and display circuit board 150 is mounted to abut the top surfaces of the slider 130 on either side of the scale member 102.

Some calipers similar to the type shown in FIG. 1 are powered by one or more batteries that connect to the electronic assembly 160. It is also known to power similar calipers with solar cells, for example as taught in U.S. Pat. No. 4,963,811 (hereafter "the '811 patent") which is hereby incorporated by reference in its entirety. The '811 patent teaches a power management system including a solar collector, a storage device (e.g., a storage capacitor), and a power control circuit. If the solar collector provides more power than required for operating the caliper, the power control circuit may connect the solar collector to the storage device, to store reserve energy. The caliper may at times be operated exclusively on the stored energy.

For the purposes of this disclosure, the electronic assembly 160 may comprise a power management portion 156 analogous to that of the '811 patent. The power management portion 156 includes an energy storage device 156es and a power conditioning and control circuit 156pc. The energy storage device 156es may be a battery or a capacitor, for example, which stores energy for operating the caliper 100. The power conditioning and control circuit 156pc may provide power and energy management functions analogous to those outlined above and/or in the '811 patent, in order to store and use energy generated as disclosed herein, which may be provided in the form of an alternating current or voltage. Therefore, the power conditioning and control circuit 156pc may also include a boost and rectification circuit that boosts and rectifies AC voltage from the power generator shown in later figures, such that it may be stored by the energy storage device 156es and used to operate the caliper 100. For example, one applicable boost and rectification circuit is described in the article "Highly efficient integrated rectifier and voltage boosting circuits for energy harvesting applications," *Adv. Radio Sci.*, 6:219-225, 2008, incorporated by reference herein. In some embodiments, some or all of the power conditioning and control circuit 156*pc* may be merged with and/or indistinguishable from the signal processing and control circuit 159.

It should be appreciated that while a magnetic or inductive caliper is described above, an electronic caliper using any sensor type may be adapted to the principles described with reference to FIGS. 2-7. For example, a caliper using capacitive sensing technology may utilize features described in FIGS. 2-7.

Figure 2:
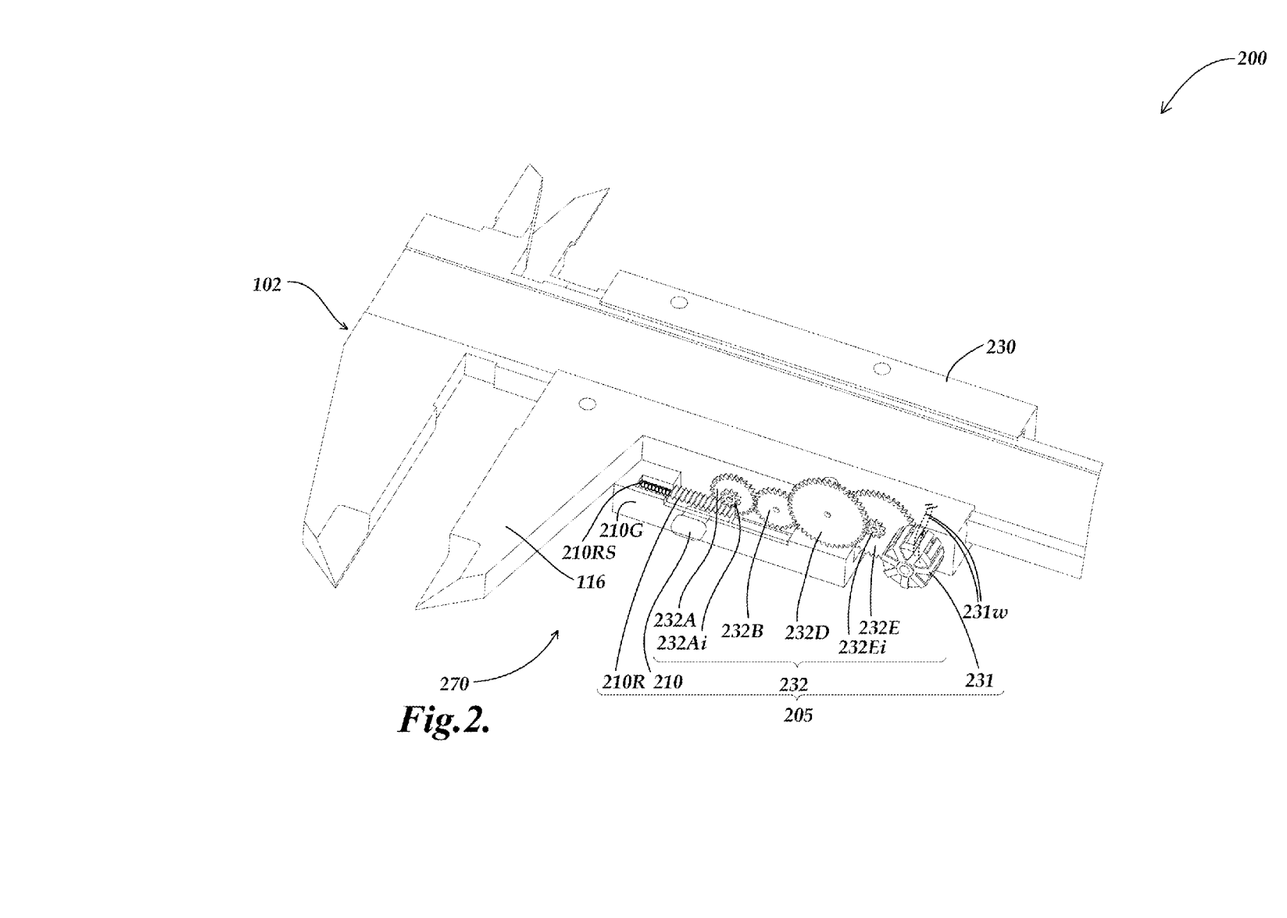
FIG. 2 is a diagram of a first embodiment of a power generating arrangement integrated in a caliper.

FIG. 2 is a diagram of a first embodiment of a power generating arrangement 205 integrated in a caliper 200. The caliper 200 may be similar to the caliper 100, and therefore only the significant differences are described with respect to FIG. 2. Certain portions of the scale member 202 are omitted from FIG. 2, such that various components of the power generating arrangement 205 may be more clearly illustrated. As illustrated in FIG. 2, the power generating arrangement 205 is integrated with and moves with the slider 230 (which may be used in the slider assembly 170, shown in FIG. 1). The power generating arrangement 205 comprises a gear assembly 232 and a power generator 231 and a power generating handle 210. In this embodiment, the power generating handle 210 is connected to a rack 210R including gear teeth. The power generating handle 210 is driven by a user (e.g., by the user's right hand thumb, while the slider is held in the user's other right hand fingers) which drives the rack 210R. The power generating handle 210 is guided by and/or constrained in a groove in support guide 210G, either directly or by virtue of being attached to the rack 210R which may be guided by and/or constrained in the groove, as illustrated. The support guide 210G may be fastened too, or integrated with the slider 230. In some embodiments, the power generating handle 210 may be guided by and/or constrained in an alternative or mating handle support feature incorporated in the caliper cover (e.g., into a suitable adapted cover 140).

The gear assembly 232 comprises an input element, which in this embodiment is the inner gear 232Ai, which is driven by the rack 210R, and which is joined to or integral with a larger diameter gear 232A. It further comprises a gear 232B which is driven by the gear 232A. It further comprises an inner gear 232Ci (not visible in this view, but illustrated in FIG. 3), which is driven by the gear 232B, which is joined to or integral with a larger diameter gear 232C. It further comprises an inner gear 232Di (not visible in this view, but illustrated in FIG. 3) which is driven by the gear 232C (not visible in this view, but illustrated in FIG. 3), which is joined to or integral with a larger diameter gear 232D. It further comprises an inner gear 232Ei which is driven by the gear 232D, which is joined to or integral with a larger diameter gear 232E. It will be appreciated that the gear tooth speed of the gear 232E is made to be much higher than the speed of the rack 210R by this configuration, such that it is suitable for driving the generator 231 at high RPM when a user moves the power generating handle 210 and rack 210R.

The gear assembly 232 further comprises a gear 231*gg* (not visible in this view, but illustrated in FIG. 3) that is joined to an axle of the generator 231, and which is driven by the gear 232E (either directly or through an idler gear, or the like). The various gears of the gear assembly 232 may rotate on axles (and/or bearings) that are positioned in holes (not shown) in the slider 230. An axle of the power generator 231 may alternatively be cantilevered off of a suitable portion of the electronic assembly 160 in some embodiments. The slider 230 may include other features as needed to accommodate the power generating arrangement 205, as will be apparent to one of ordinary skill in the art, based on this disclosure.

To summarize, in operation, when a user moves the power generating handle 210, thereby driving the gear assembly 232, the components of the gear assembly 232 drive the rotating portion of the power generator 231 (e.g., a magnetic rotor) to generate power. In some embodiments, the power generating handle 210 and/or the rack 210R may be connected to a return spring 210RS that has an end directly or indirectly fastened to the slider. When the user actuates the power generating handle 210, this may extend or compress the return spring 210RS, which stores energy to return the power generating handle 210 to its starting position (when the user releases it), to generate additional power during that return. Alternatively, the return spring 210RS may be omitted and the user may simply provide force to operate the handle in both directions.

The power generator 231 may be similar to the power generators used in commercially available wrist watches. For example, microgenerators available from Kinetron and/or microgenerators disclosed in U.S. Pat. Nos. 5,923,619 and/or 6,124,649, which are hereby incorporated herein in their entirety, may be adapted to the principles disclosed herein. The power generator 231 may have electric leads 231*w*, shown schematically in dashed outline, which may be connected to the previously outlined power management portion 156.

In the embodiment outlined above, the gear assembly 232 is configured to have an overall gear ratio such that during an expected speed that a user may move the power generating handle 210 during operation, the generator 231 is rotated at a rate that provides relatively efficient power generation (e.g., 1000-10000 RPM). However, in various embodiments, it is also desirable that when the power generating arrangement 205 generates power as the user moves the power generating handle 210, it contributes a motion resistance force component of at most approximately 20N.

In the embodiment shown in FIG. 2, a user may drive the power generating handle 210 with a thumb, in a convenient and ergonomic manner. Because the power generating handle 210 may be driven with a thumb relative to the slider, it may be desirable that a short distance of motion is used for the power generating handle 210, but the gear assembly 232 is nevertheless driven through a plurality of rotations to sustain the motion of the generator 231 for as long as possible at high RPM. In some embodiments, the range of motion of the power generating handle is limited to at most 2.5 inches, or 1.25 inches in other embodiments, or less.

As previously indicated, in embodiments that limit the range of motion of the power generating handle for desirable ergonomics, it is desirable to use a high gear ratio to drive the power generator 231 at a sufficient rotational speed for a sufficient time. In order to provide a high gear ratio within a limited space tolerance for the face width of the gears, it is necessary in some embodiments for the gear assembly to comprise at least four gear elements. However, it is also desirable to limit the number of gears for economic and ergonomic reasons. Therefore, in some embodiments, the gear assembly 232 comprises at most six gears. Gears with a relatively high diametral pitch may allow fewer gears to achieve a sufficient rotational speed in the power generator 231. Thus, in some embodiments, it is desirable that the gear assembly comprises gears with a diametral pitch of at least 80 or more.

A high gear ratio may be limited by design considerations related to motion resistance forces transferred to the gear teeth, leading to premature failure or wear. The inventor has determined that in some embodiments disclosed herein, it is desirable that the gear assembly comprises gears with a face width of at least 0.075 inches (e.g., at least for the relatively smaller diameter gears). The inventor has also determined that in some embodiments disclosed herein, it is desirable that the gear assembly comprises gears with a face width of at most 0.15 inches in relation to compact caliper size and other design considerations.

It will be appreciated that this motion resistance force component is exerted between the power generating handle 210 and the input element of the gear assembly, which in this case is between the rack 210R and the input gear 232Ai. The motion resistance force component may arise primarily due to the inertia of the gear assembly 232 and the generator 231, the magnetic forces arising in the generator 231 (generator work), and friction in the power generating arrangement 205, and is also influenced by the relationships between the radii of the various gears. Thus, in various embodiments, a suitable combination of gear inertia, gear radii, etc., is to be determined (e.g., by analysis and or experiment) based on this disclosure, such that when a user moves the power generating handle 210 at a maximum expected acceleration and/or speed, the motion resistance force component contributed by the power generating arrangement 205 is at most approximately 20N, or 10N in other embodiments, or less.

Figure 8:
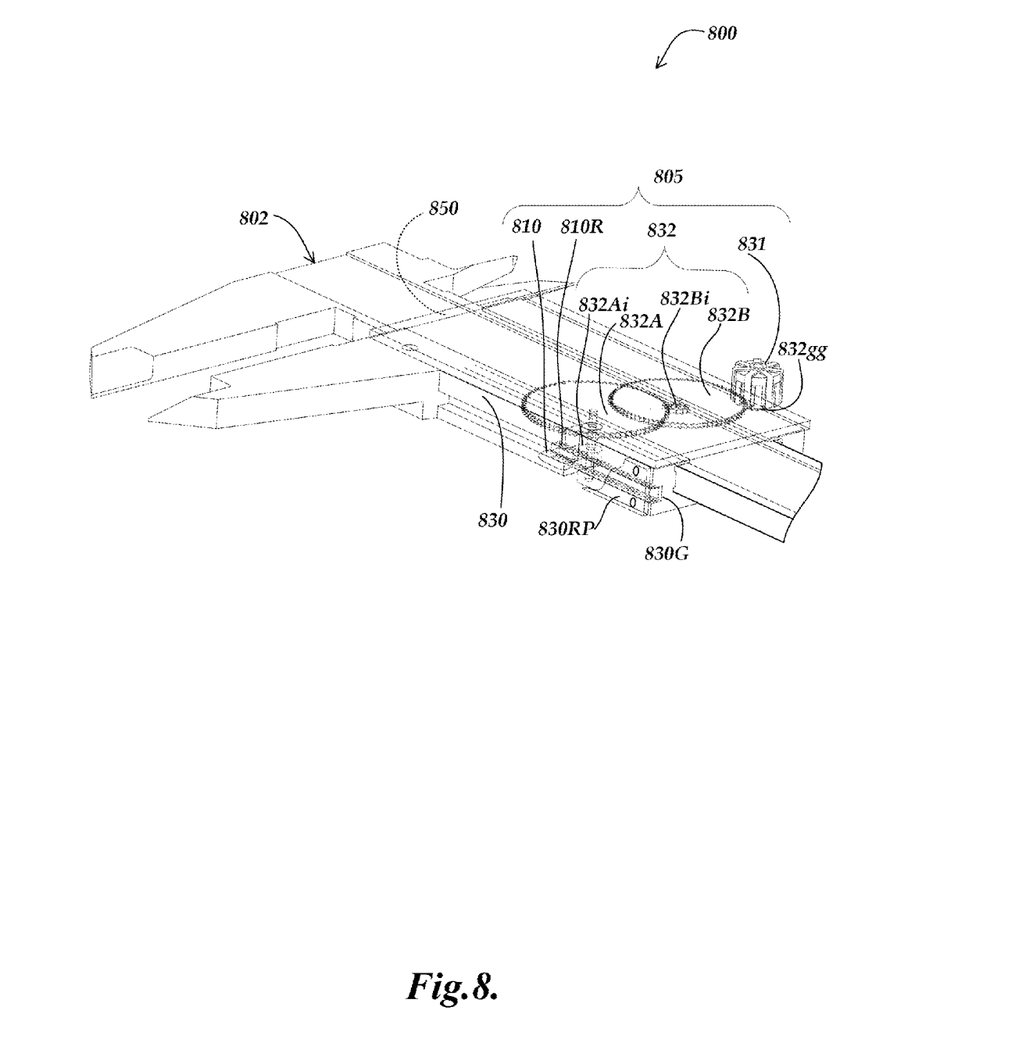
FIG. 8 is a diagram of a fifth embodiment of a power generating arrangement integrated in a caliper.

It will be appreciated that the particular gear configuration illustrated in FIG. 2, and outlined above, is exemplary only and not limiting. For example, FIG. 8 shows an embodiment including a significantly different gear assembly mounting configuration, wherein gears of the power generating arrangement are located in a volume between the top of a scale member and the inside of a cover which encloses a signal processing portion. Alternatively, in some embodiments, at least some gears of the power generating arrangement may be located in a volume between the bottom of the scale member and an inside surface of a portion of the slider that wraps around the bottom of the scale member. A planetary gear arrangement may be used in still other embodiments. These and other alternatives will be apparent to one of ordinary skill in the art based on the teachings of this disclosure.

Figure 3:
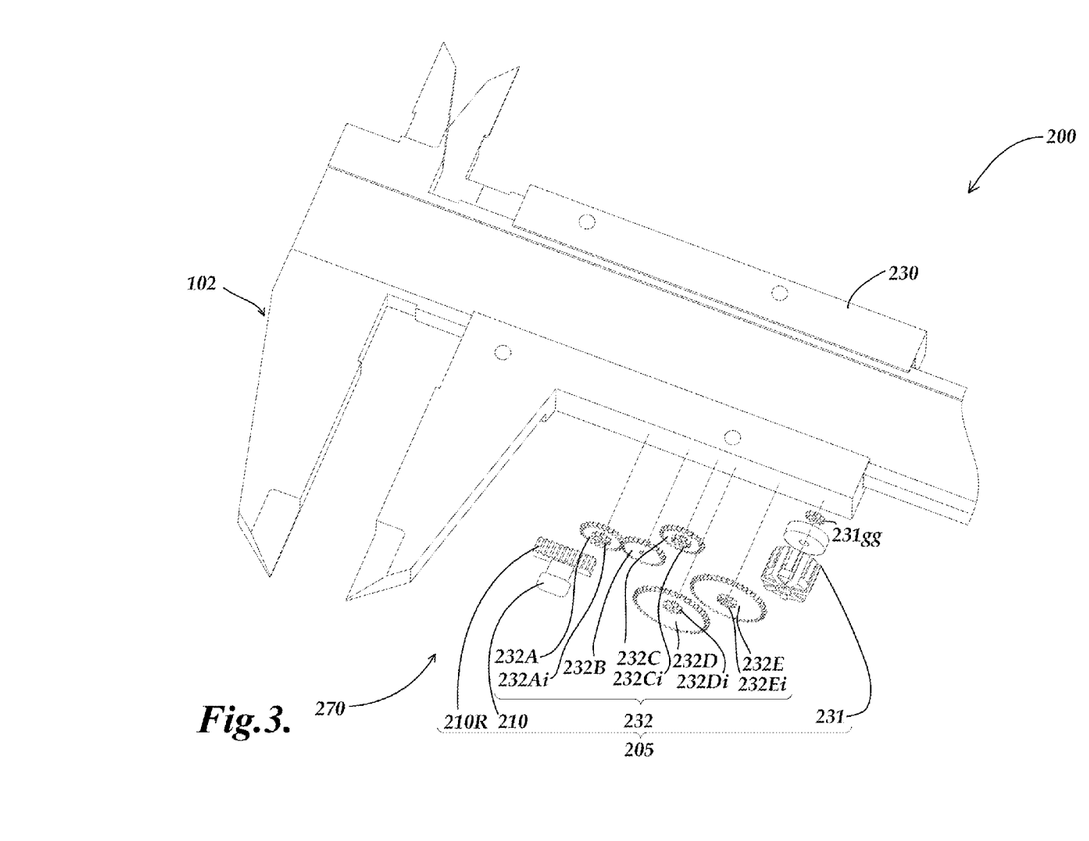
FIG. 3 is an exploded diagram of the power generating arrangement of FIG. 2 showing additional details.

FIG. 3 is an exploded diagram of the power generating arrangement 205 of the caliper 200 of FIG. 2 showing additional details of elements which were not visible in the view shown in FIG. 2. In particular, FIG. 3 shows the inner gear 232Ci that is attached to the gear 232C, the inner gear 232Di that is attached to the gear 232D, and the gear 232gg that is attached to the axle of the power generator 231.

Figures 4A, 4B, 4C:
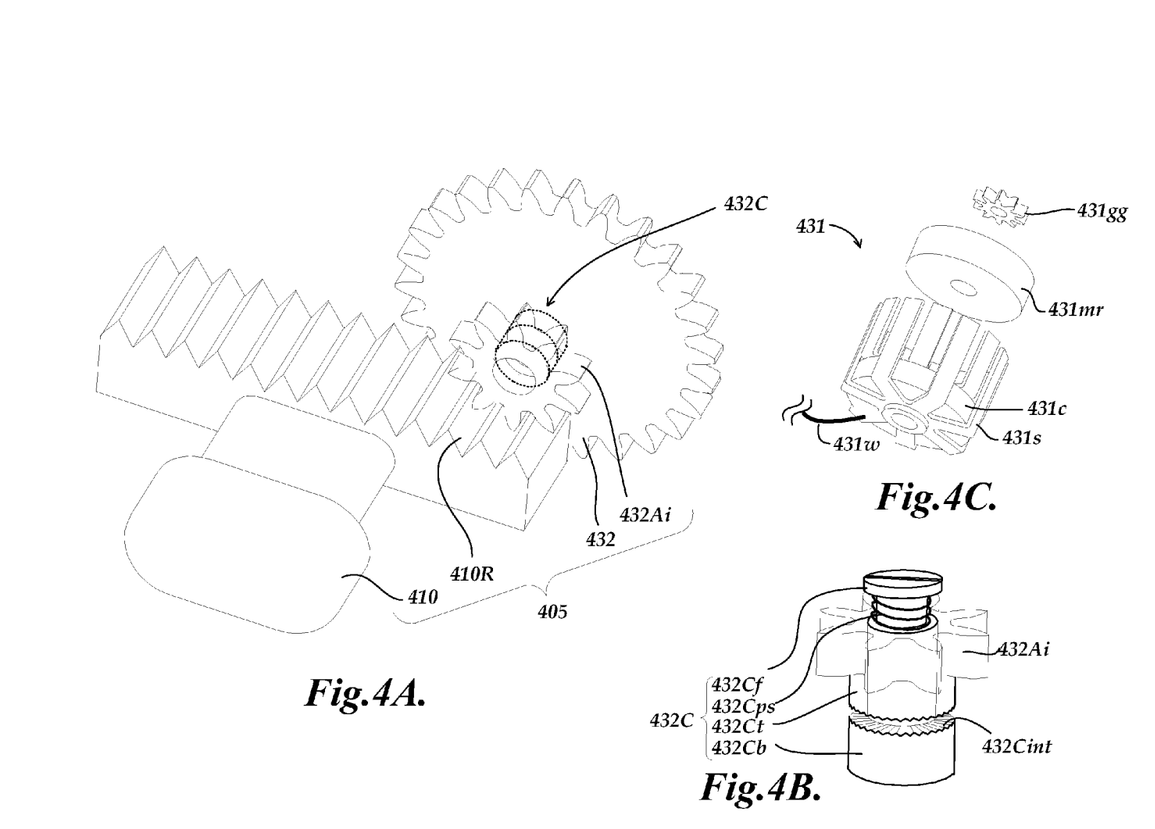
FIGS. 4A, 4B and 4C are detailed diagrams of a second embodiment of a power generating arrangement integrated in a caliper.

FIGS. 4A and 4B are detailed diagrams of a portion of a gear assembly 432 which may be incorporated in a second embodiment of a power generating arrangement 405 which is integrated in a caliper according to the principles disclosed herein. FIG. 4C shows additional details of one embodiment of a power generator 431 as integrated into a caliper. The gear assembly 432 may be similar to the gear assembly 232 and elements numbered 4XX may be similar or analogous to elements 2XX of the caliper 200. Therefore, only the significant differences are described in detail with respect to FIGS. 4A and 4B. The gear assembly 432 is different than the gear assembly 232 in that it includes a force-limiting clutch 432C, which is shown in FIG. 4A and further magnified in FIG. 4B, described further below.

As previously indicated, it is desirable that when the power generating arrangement 405 generates power as the user moves the power generating handle 410, it contributes a motion resistance force component of at most approximately 20N. In various embodiments, the force-limiting clutch 432C is configured (e.g., by analysis and/or experiment) based on this disclosure, such that when a user manually moves the power generating handle 410 at a maximum acceleration and/or speed, or less, that the motion resistance force component contributed by the power generating arrangement 405 is at most approximately 20N, or 10N in other embodiments, or less. In other words, if the power generating handle 410 is moved such that the power generating arrangement 405 would contribute a motion resistance force component along the rack 410R that exceeds approximately 20N (or 10N, or less, in some embodiments), the force-limiting clutch 432C is set such that it slips and/or effectively disengages or decouples at least a portion of the gear assembly 432 (and the generator 431) from the rack 410R, to limit the motion resistance force component at the desired level in order to avoid damage or excessive wear of the elements of the gear assembly 432 and the generator 431.

It will be appreciated that this may effectively decouple the drive of the generator 431, sacrificing the power generation in order to absolutely limit the motion resistance force component. However, it will be appreciated that whenever the motion resistance force component falls below the limit determined by the clutch 432C, it effectively reengages or couples the gear assembly 432 (and the generator 431) to the rack 410R and again generates power.

Furthermore, the presence of the clutch allows desirable design tradeoffs. For example, in some such embodiments, in contrast to the power generating arrangement 205 which had no clutch, it is not necessary to configure the overall gear ratio of the power generating arrangement 405 to limit its motion resistance force component, because the clutch provides that limit. Rather, it may have a larger desirable gear ratio such that lower power generating handle speeds provide higher generator RPM, to advantageously generate more power at lower speeds of motion of the power generating handle, for example. Since the gear ratio need not be conservatively limited, this may actually produce a net gain in generated power relative to the power generating arrangement 405.

One simplified embodiment of a force-limiting clutch 432C is shown magnified in FIG. 4B. The clutch mechanism 432C includes a top clutch element 432Ct that is joined to the inner gear 432Ai, and a bottom clutch element 432Cb that is joined to the outer gear 432B. Mating ridged surfaces of these elements meet at the clutch interface 432Cint. The elements are illustrated with a separation at the interface, but this is for purposes of illustration only. In operation, the elements are biased to mate against one another under the force of the clutch preload spring 432Cps, which is compressed against the inner gear 432Ai by the fastener 432Cf. The fastener 432Cf screws into an axle (shown in dashed outline) that is joined to the bottom clutch element 432Cb and/or the outer gear 432A.

Under normal operation, the clutch preload spring 432Cps forces the top clutch element 432Ct to slide down along the axle such that the mating ridges of the clutch elements mesh at the clutch interface 432Cint, such that torque is transmitted at the interface and the inner gear 432Ai drives the outer gear 432A. The clutch preload spring is designed and/or adjusted (e.g., by adjusting the fastener 432Cf) such that when the force of the rack on the inner gear 432Ai exceeds the desired motion resistance force component, the force/torque on the mating ridges at the clutch interface 432Cint causes the top clutch element 432Ct to slip up and over the ridges of the lower clutch elements 432Cb, which effectively disengages the inner gear 432Ai from the outer gear 432A, allowing the inner gear 432Ai to rotate more freely and reduce its reaction force component on the rack 410R to the desired level.

It will be appreciated that the particular simplified clutch configuration illustrated in FIGS. 4A and 4B, and outlined above, is exemplary only and not limiting. For example, planar friction plates may be used instead of ridged elements, and/or conical or cylindrical elements may form the clutch interface, and/or bearings or other additional elements may be added to reduce wear at various bearing points, and/or the diameter of clutch elements and various other elements may be altered, or the clutch may be oriented in a different plane using suitably adapted gears, and so on. These and other alternatives will be apparent to one of ordinary skill in the art based on the teachings of this disclosure.

As previously stated, FIG. 4C shows additional details of one embodiment of a power generator 431. The generator 431 may comprise a coil 431c, a stator 431s, a magnetic rotor 431mr, driven by a gear 431gg. The magnetic rotor 431mr is attached to an axle (not shown) which is attached to the gear 431gg. In some embodiments, the magnetic rotor 431mr may be a multi-pole SmCo alloy magnet such as that described in U.S. Pat. No. 5,229,738. The outer gear 432E rotates the gear(s) 431gg, thereby causing the magnetic rotor 431mr to rotate with respect to the coil 431c, which thereby generates energy that may be transmitted as AC power to the power management portion 156 through a wire connection 431w, which may be connected to the adjacent signal processing and display circuit board (e.g., the circuit board 150).

It should be appreciated that while the elements of the power generating arrangement 405 are shown in a similar configuration to that of the caliper 200, embodiments of such elements may be adapted to any suitable caliper configuration, as will be understood by one of ordinary skill in the art based on the teachings of this disclosure.

Figures 5A, 5B:
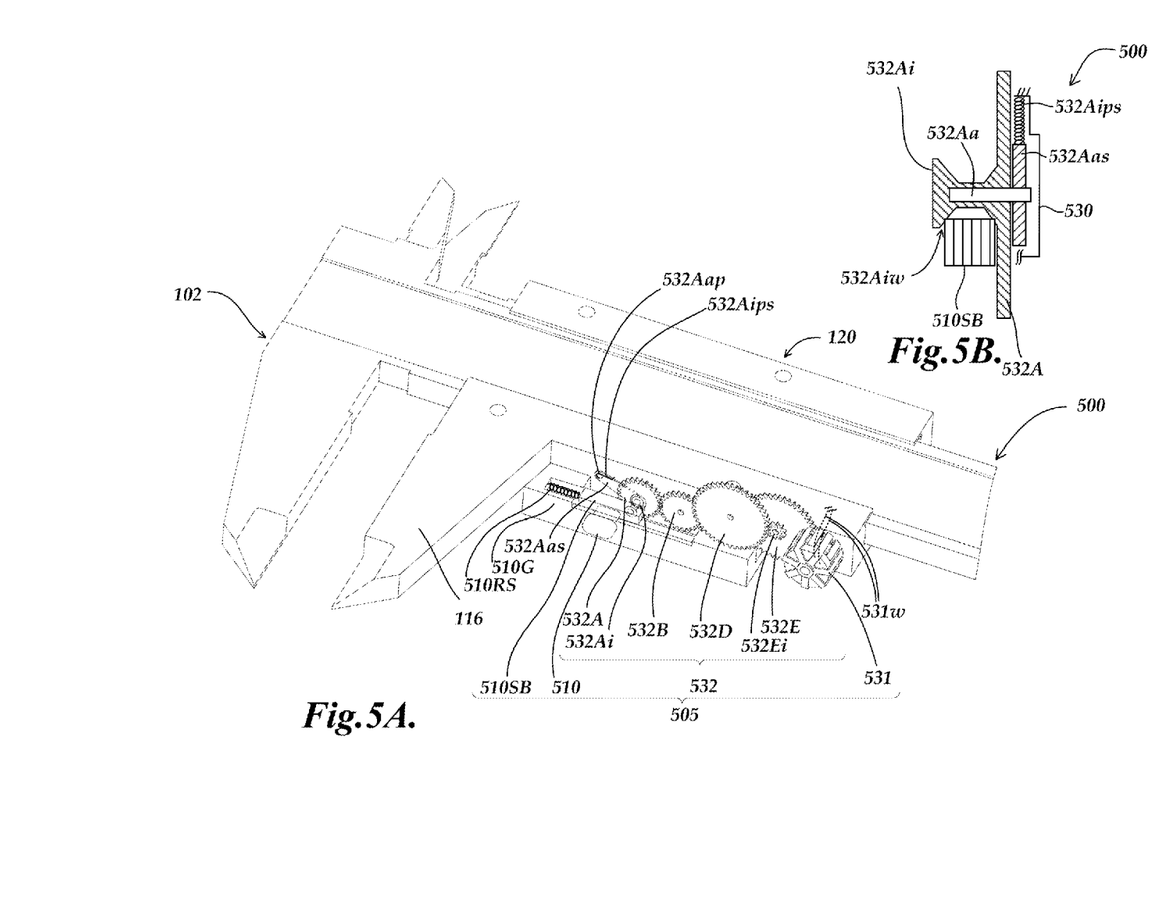
FIGS. 5A and 5B are diagrams of a third embodiment of a power generating arrangement integrated in a caliper.

FIGS. 5A and 5B are diagrams illustrating a portion of a third embodiment of a power generating arrangement 505 integrated in a caliper 500. The caliper 500 may be similar to the caliper 200, the power generating arrangement 505 may be similar to the power generating arrangement 205 or 405, and elements numbered 5XX may be similar or analogous to elements 2XX of the caliper 200 or elements 4XX of the caliper power generating arrangement 405. Therefore, only the significant differences are described in detail with respect to FIGS. 5A and 5B.

In particular, the gear assembly 532 is different than the gear assemblies 232 and 432 in that the input element that provides the function of the previously described input gear (e.g., the gear 232Ai or 432Ai) is a friction roller 532Ai that may be joined to an outer gear 532A. The friction roller 532Ai engages, through friction, at least one edge of a surface block 510SB connected to the power generating handle 510, and is thereby rotated to drive the outer gear 532A. Thus, in comparison to the calipers 200, the rack (e.g., the rack 210R) may be eliminated.

It will be understood that the gear assembly 532 may otherwise be similar or analogous to the gear assembly 232 or 432, and that the slider 530 may be similar to the slider 230, except the locations of various gears, axles, holes, and recesses may be adjusted to accommodate the configuration of the friction roller. In one embodiment, the friction roller 532Ai and outer gear 532A may be mounted to rotate on an axle 532Aa (shown in FIG. 5B) supported in the slider 530.

In the illustrated embodiment, the axle 532Aa may be mounted in an axle support 532Aas, that may rotate a short distance on the slider 530 about a pivot 532Aap, which provides a degree of freedom for the position of the friction roller 532Ai, such that its friction pressure against the surface block 510SB is applied by engaging a pressure spring 532Aips, schematically shown in FIG. 5B. In one embodiment, the pressure spring 532Aips may be a torsion spring mounted about the pivot 532Aap.

It will be appreciated that the particular simplified pressure spring configuration illustrated in FIGS. 5A and 5B, and outlined above, is exemplary only and not limiting. Also, a force-limiting clutch may be implemented in the gear assembly 532 if desired (e.g., between the gear 532Ai and the outer gear 532A, in one embodiment). These and other alternatives will be apparent to one of ordinary skill in the art based on the teachings of this disclosure.

Figure 6:
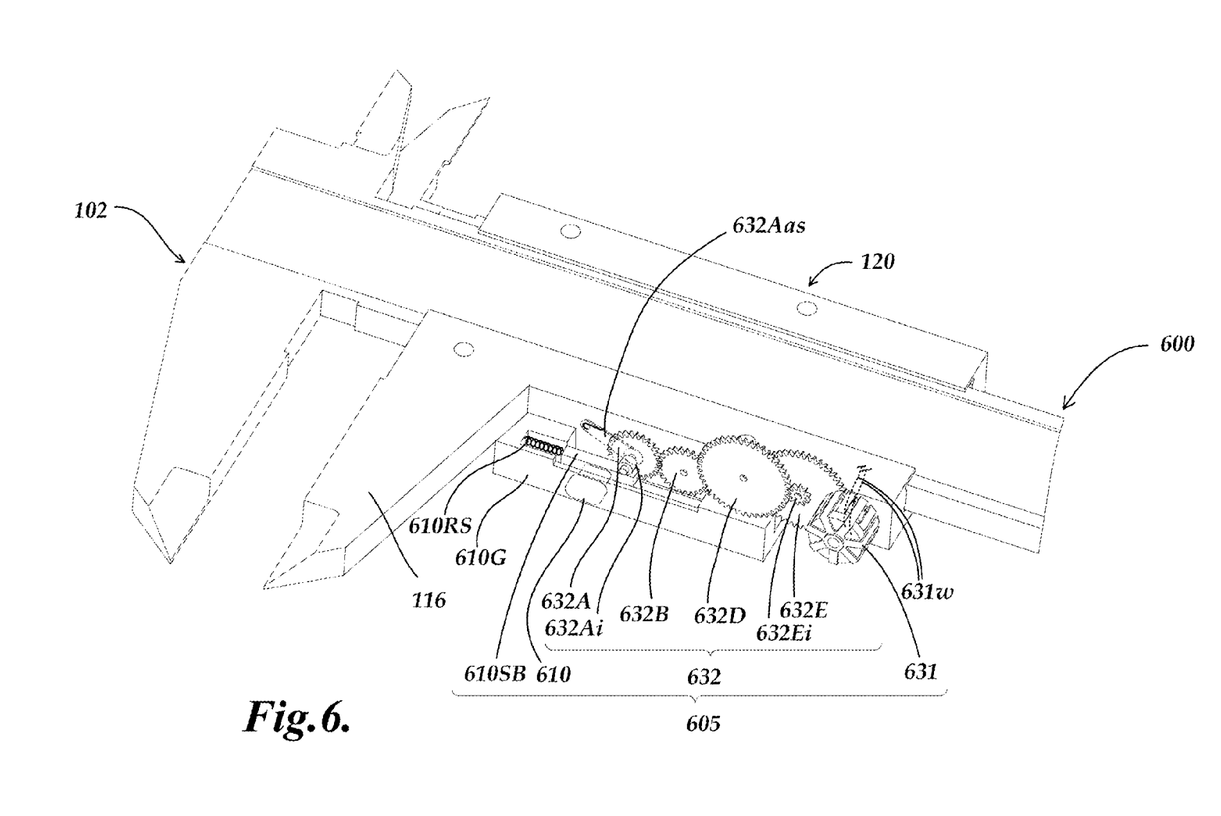
FIG. 6 is a diagram of a fourth embodiment of a power generating arrangement integrated in a caliper.

FIG. 6 is a diagram of a fourth embodiment of a power generating arrangement 605 integrated in a caliper 600. The caliper 600 may be similar to the caliper 200 or 500, and the power generating arrangement 605 may be similar to the power generating arrangement 205, 405, or 505, and elements numbered 6XX may be similar or analogous to elements 2XX of the caliper 200, 4XX of the power generating arrangement 405, or 5XX of the caliper 500. Therefore, only the significant differences are described in detail with respect to FIG. 6.

In particular, the gear assembly 632 is different than the gear assemblies 232, 432, and 532 in that the input element that provides the function of the previously described input gear (e.g., the gear 232Ai, 432Ai, or 532Ai) is a friction roller 632Ai that may be joined to an outer gear 632A and which engages, through friction, a surface of the surface block 610SB that is connected to the power generating handle 610 to drive the outer gear 632A. In the illustrated embodiment, the axle 632Aa may be biased in the direction of the surface block 610SB by a pressure spring (e.g., using a spring loaded axle support as previously outlined with reference to the axle support 532Aas in FIG. 5) to provide a desired friction pressure. The friction roller 632Ai may comprise a polymer sleeve or coating that has a high friction coefficient and presses against handle 610. A force-limiting clutch may be implemented in the gear assembly 632 if desired (e.g., between the friction roller 632Ai and the outer gear 632A, in one embodiment, in a manner analogous to the caliper 400). These and other alternatives will be apparent to one of ordinary skill in the art based on the teachings of this disclosure.

Figure 7:
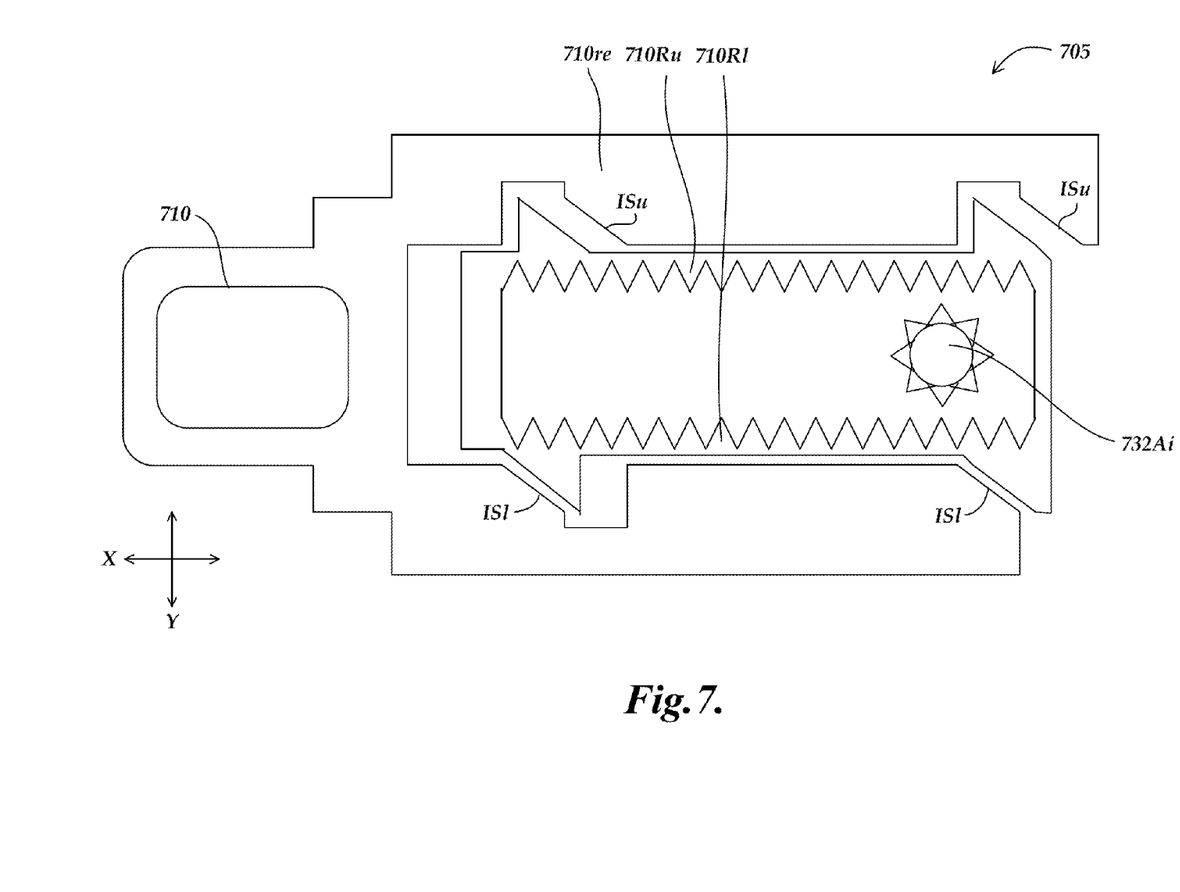
FIG. 7 is a diagram of a portion of a reciprocating element configured to drive an input gear in the same rotational direction when the user moves the power generating handle in either of opposite directions, which may be incorporated in a power generating arrangement integrated in a caliper.

FIG. 7 is a diagram of a portion of a power generating arrangement 705 comprising a reciprocating element 710re configured to drive an input gear 732Ai in the same rotational direction when the user moves a power generating handle 710 in either of opposite directions, which may be incorporated in a power generating arrangement 705 integrated in a caliper (e.g., similar to the power generating arrangement 205 in the caliper 200). Elements numbered 7XX may be similar or analogous to elements 2XX of the caliper 200. Therefore, only the significant differences are described in detail with respect to FIG. 7.

In the embodiment shown in FIG. 7, the power generating handle 710 is connected to the reciprocating element 710re, an upper rack 710Ru, and a lower rack 710R1. The reciprocating element 710re is configured to drive the input element in the same rotational direction when the user moves the power generating handle 710 in either of opposite directions along the X axis. In operation, as a user moves the power generating handle 710 toward the negative X direction, the inclined surfaces ISu of the reciprocating element push the upper rack 710Ru downward such that it engages the top part of an inner gear 732Ai, which drives the inner gear 732Ai such that it turns counter clockwise (with respect to the X-Y plane). Conversely, as the user moves the power generating handle 710 toward the positive X direction, the inclined surfaces IS1 of the reciprocating element push the lower rack 710R1 upward such that it engages the lower part of the inner gear 732Ai, which also drives the inner gear 732Ai such that it turns counter clockwise (with respect to the X-Y plane). In this manner, the user may push the handle 720 alternately in both directions of motion along the X direction to continuously drive the inner gear 732Ai in the same direction. This configuration eliminates reversing the direction of the gear assembly rotations, conserving angular momentum, and improving the efficiency and ergonomics of the power generating operation.

FIG. 8 is a diagram of a fifth embodiment of a power generating arrangement 805 integrated in a caliper 800. The caliper 800 may be similar to the caliper 200, and the power generating arrangement 805 may be analogous to the power generating arrangement 205, and elements numbered 8XX may be similar or analogous to elements 2XX of the caliper 200. Therefore, only the significant differences are described in detail with respect to FIG. 8.

In particular, the gear assembly 832 is different than the gear assembly 232 in that at least some gears of the gear assembly 805 are located in a volume between the top of the scale member 802 and the inside of a cover that encloses the signal processing portion (e.g., the cover 140, shown in FIG. 1). The input element that provides the function of the previously described input gear (i.e., the gear 232Ai) is an inner gear 832Ai that may be joined to an outer gear 832A. The gear assembly 832 comprises an input element that, in this embodiment, is the inner gear 832Ai that is driven by the rack 810R and which is joined to or integral with a larger diameter gear 832A. It further comprises an inner gear 832Bi that is driven by the gear 832A that is joined to or integral with a larger diameter gear 832B. The gear assembly 832 further comprises a gear 831gg that is joined to an axle of the generator 831, and which is driven by the gear 832B (either directly or through an idler gear, or the like). Thus, the gear assembly 832 has fewer total gears than previously described embodiments, but otherwise fulfills previously outlined principles.

As indicated above, at least some gears of the gear assembly 832 are located in a volume between the top of the scale member 802 and the inside of a cover that encloses the signal processing portion. In the illustrated embodiment, it may be seen that the gears 832A, 832Bi, and 832B, as well as the generator 831, are located in this volume, which may have advantages, such as economical assembly, for example. In this particular embodiment, the gears and generator are between the circuit board 850 (shown in dashed outline) and the cover.

The axles for the gear 832B and the generator 831 may be mounted in or on the circuit board 850 (e.g., in inserts, or on an assembly frame that is mounted to the circuit board 850). The axles and or mounting frame may be configured to provide clearance for the various electronic components relative to the gears and generator. The rack 810R may be guided in a groove 830G in the slider, and may be retained in the groove by a retaining plate 830RP a portion of which is shown in a cutaway view.

It will be understood that, despite different gear orientations, minor configuration differences in the gear assembly 832 may otherwise satisfy functions and principles similar or analogous to the gear assembly 232, and that the caliper 800 may be similar to the caliper 200, except the locations of various circuit elements, gears, axles, holes, and recesses may be adjusted as outlined above. A force-limiting clutch may be implemented in the gear assembly 832, if desired (e.g., between the inner gear 832Ai and the outer gear 832A, in one embodiment). These and other alternatives will be apparent to one of ordinary skill in the art based on the teachings of this disclosure.

While various embodiments of the invention have been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. An electrically powered caliper configured to generate power for measurement operations, the caliper comprising:
   a scale member;
   a slider;
   a signal processing portion configured to measure a displacement between the scale member and the slider; and
   a power generating arrangement fixed relative to the slider comprising:
      a power generating gear assembly configured to rotate in response to a force provided through a power generating handle to the gear assembly by a user moving the power generating handle relative to the gear assembly; and
      a power generator coupled to the gear assembly and configured to rotate in response to force provided by the rotating gear assembly and provide power to the signal processing portion,
   wherein:
      the power generating arrangement generates power as the user moves the power generating handle; and
      the power generating arrangement is configured such that it contributes a motion resistance force component as the user moves the power generating handle and the gear assembly comprises a force-limiting clutch that is configured to limit the motion resistance force component.

2. The caliper of claim 1, wherein the power generating arrangement is configured such that it contributes a motion resistance force component of at most 20N during the user moving the power generating handle using at least one of a maximum manual speed or a maximum manual acceleration.

3. The caliper of claim 2, wherein the power generating arrangement is configured such that it contributes a motion resistance force component of at most 10N.

4. The caliper of claim 1, wherein the gear assembly comprises an input element that is driven by the force provided through the power generating handle and the force-limiting clutch is located between the input element and a gear coupled to the input element by the force-limiting clutch.

5. The caliper of claim 1, wherein the force-limiting clutch is configured to limit the motion resistance force component to at most 10N.

6. The caliper of claim 1, wherein the signal processing portion comprises an energy storage element comprising at least one of a battery and a capacitor configured to store energy generated by the power generating arrangement.

7. The caliper of claim 1, wherein the gear assembly comprises an input element of a smaller diameter that is coupled to an outer gear of a larger diameter that drives an inner gear of a smaller diameter that is coupled to another outer gear of a larger diameter that drives the power generator through at least one additional gear.

8. The caliper of claim 1, wherein the gear assembly comprises at most six gears.

9. The caliper of claim 1, wherein the gear assembly comprises gears with a diametral pitch of at least 80 teeth per inch.

10. The caliper of claim 1, wherein the gear assembly comprises gears with a face width of at most 0.15 inches.

11. The caliper of claim 1, wherein at least some gears of the power generating arrangement are located in a volume between the top of the scale member and the inside of a cover that encloses the signal processing portion.

12. An electrically powered caliper configured to generate power for measurement operations, the caliper comprising:
a scale member;
a slider;
a signal processing portion configured to measure a displacement between the scale member and the slider; and
a power generating arrangement fixed relative to the slider comprising:
a power generating gear assembly configured to rotate in response to a force provided through a power generating handle to the gear assembly by a user moving the power generating handle relative to the gear assembly; and
a power generator coupled to the gear assembly and configured to rotate in response to force provided by the rotating gear assembly and provide power to the signal processing portion,
wherein:
the power generating arrangement generates power as the user moves the power generating handle; and
at least one of the power generating handle and an input driving element connected to the power generating handle is constrained to be guided along a path in a support guide, and the path is approximately parallel to the scale member.

13. The caliper of claim 12, further comprising an input element that comprises a gear that is driven by a rack connected to the power generating handle.

14. The caliper of claim 12, wherein the range of motion of the power generating handle is limited to at most 1.25 inches.

15. The caliper of claim 12, wherein the power generating handle comprises a reciprocating element configured to drive an input element in the same rotational direction when the user moves the power generating handle in either of opposite directions.

16. The caliper of claim 12, wherein at least some gears of the power generating arrangement are located in a volume between the bottom of the scale member and an inside surface of a portion of the slider that wraps around the bottom of the scale member.

17. The caliper of claim 12, further comprising a return spring that stores energy to return the power generating handle to its starting position when the user releases it after moving it in a first direction to generate power.

18. An electrically powered caliper configured to generate power for measurement operations, the caliper comprising:
a scale member;
a slider;
a signal processing portion configured to measure a displacement between the scale member and the slider; and
a power generating arrangement fixed relative to the slider comprising:
a power generating gear assembly configured to rotate in response to a force provided through a power generating handle to the gear assembly by a user moving the power generating handle relative to the gear assembly; and
a power generator coupled to the gear assembly and configured to rotate in response to force provided by the rotating gear assembly and provide power to the signal processing portion,
wherein:
the power generating arrangement generates power as the user moves the power generating handle; and
the gear assembly comprises an input element that is driven by the force provided through the power generating handle comprising one of a gear and a friction roller.

19. The caliper of claim 18, wherein the input element comprises a friction roller that is driven by a surface connected to the power generating handle.

20. The caliper of claim 19, wherein the caliper comprises a spring element that presses the friction roller against the surface connected to the power generating handle.

* * * * *